United States Patent
Duan et al.

(10) Patent No.: US 8,208,254 B2
(45) Date of Patent: Jun. 26, 2012

(54) SLIDE MECHANISM FOR SLIDE-TYPE PORTABLE ELECTRONIC DEVICE

(75) Inventors: Chao Duan, Shenzhen (CN); Jian-Wei Li, Shenzhen (CN); Chia-Hua Chen, Taipei (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 236 days.

(21) Appl. No.: 12/764,194

(22) Filed: Apr. 21, 2010

(65) Prior Publication Data

US 2011/0096475 A1   Apr. 28, 2011

(30) Foreign Application Priority Data

Oct. 27, 2009   (CN) .......................... 2009 1 0308914

(51) Int. Cl.
*G06F 1/16* (2006.01)
*H04M 1/00* (2006.01)
(52) U.S. Cl. ............ 361/679.55; 361/679.56; 455/575.4
(58) Field of Classification Search .......... 361/679.01–679.45, 679.55–679.59; 455/575.1, 575.4; 345/156, 157, 168, 169; 312/223.1, 223.2

See application file for complete search history.

(56) References Cited

U.S. PATENT DOCUMENTS

| | | | |
|---|---|---|---|
| 6,782,242 B1 * | 8/2004 | Koleda et al. ................ 455/90.3 |
| 7,267,317 B2 * | 9/2007 | Kato et al. .................... 248/429 |
| 7,496,388 B2 * | 2/2009 | Kim .......................... 455/575.4 |
| 7,663,872 B2 * | 2/2010 | Higashigawa et al. .. 361/679.26 |
| 8,108,019 B2 * | 1/2012 | Lin ............................ 455/575.4 |
| 2008/0045281 A1 * | 2/2008 | Huang et al. ............... 455/575.4 |
| 2009/0016029 A1 * | 1/2009 | Liu ............................... 361/727 |
| 2009/0149228 A1 * | 6/2009 | Wang et al. ................ 455/575.4 |

FOREIGN PATENT DOCUMENTS

CN    101489364 A    7/2009

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A slide mechanism includes a first plate defining two first guiding slots, a second plate defining two second guiding slots, and two connecting bodies. Each connecting body passes through the first guiding slot and the corresponding second guiding slot to connect the first plate and the second plate, and the connecting body is slidable relative to the first guiding slot and the second guiding slot. The invention also discloses a portable electronic device applying the slide mechanism.

10 Claims, 5 Drawing Sheets

SLIDE MECHANISM FOR SLIDE-TYPE PORTABLE ELECTRONIC DEVICE

BACKGROUND

1. Technical Field

The present disclosure generally relates to sliding mechanisms and, particularly, a sliding mechanism used in portable electronic devices.

2. Description of Related Art

The slide-type portable electronic device generally includes a housing, a cover, and a slide mechanism connected to the housing and the cover. The slide mechanism allows the cover to slide over the housing to open/close the portable electronic device. The slide mechanism includes a second plate and an first plate engaging with the second plate. One of the second plate and the first plate defines guiding grooves, and the other forms rails accordingly engaging with the guiding grooves.

Typically, one of the second plate and the first plate forms a post, and the other forms a stopper to engage with the post, to prevent the rails sliding out from the guiding grooves after the second plate slides a predetermined distance. The configuration of the post and the stopper increase the structural complexity of the slide mechanism.

Therefore, there is room for improvement within the art.

BRIEF DESCRIPTION OF THE DRAWINGS

Many aspects of the exemplary slide mechanism for portable electronic device can be better understood with reference to the following drawings. The components in the various drawings are not necessarily drawn to scale, the emphasis instead being placed upon clearly illustrating the principles of the slide mechanism and the portable electronic device. Moreover, in the drawings, like reference numerals designate corresponding parts throughout the diagrams.

DETAILED DESCRIPTION

Figure 1:
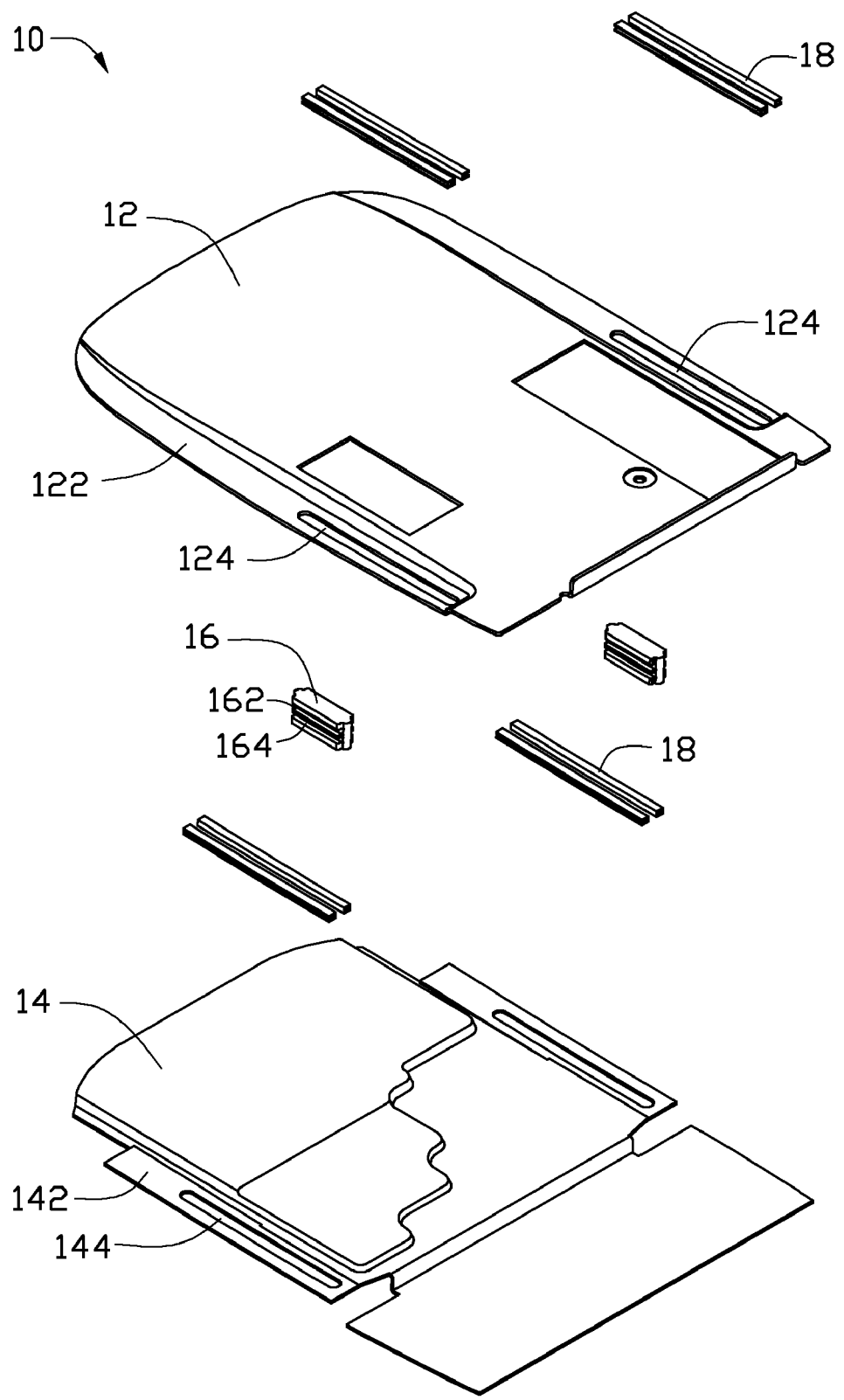
FIG. 1 is an exploded view of the slide mechanism, according to an exemplary embodiment.

FIG. 1 shows a slide mechanism 10 used in a portable electronic device such as a mobile phone, a digital camera, etc. The slide mechanism 10 includes a first plate 12, a second plate 14, two connecting bodies 16 connected to the first plate 12 and the second plate 14, and a plurality of guiding strips 18.

Each side of the first plate 12 forms a first flange 122. Each first flange 122 defines a first guiding slot 124. The first guiding slot 124 extends longitudinally along a portion of the first flange 122.

The second plate 14 engages with the first plate 12 and forms a second flange 142 at each of two sides. Each second flange 142 defines a second guiding slot 144 near the middle of the second plate 14. The second guiding slot 144 longitudinally extends along a portion of the second flange 142 and has substantially the same width as the first guiding slot 124.

Figure 2:
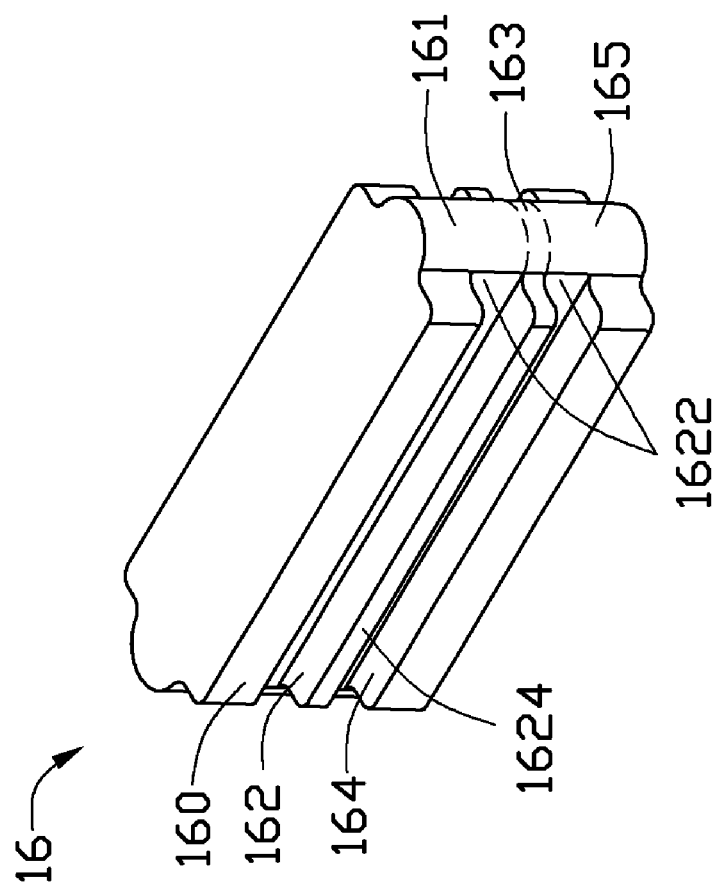
FIG. 2 is a guide body isometric view of the slide mechanism shown in FIG. 1.

Referring to FIG. 2, the connecting body 16 can be made of elastic materials, such as rubber. The connecting body 16 engages with the first guiding slots 124 and the second guiding slots 144 to connect the first plate 12 and the second plate 14. The connecting body 16 is shorter than the first and second guiding slots 124,126 and can slide relative to the first and second guiding slots 124,126. The connecting body 16 includes two opposite sidewalls 160. Each sidewall 160 defines a first groove 162 and a second groove 164 parallel to the first groove 162. Accordingly, a first spacing wall 1622 is formed between the two opposite first grooves 162, and between the two opposite second grooves 164. A second spacing wall 1624 is formed between the first groove 162 and the second groove 164 on each sidewall 160. The first spacing wall 1622 has substantially the same width as the first and second guiding slots 124, 144 and can be received in the first and second guiding slots 124, 144. Thus, the first grooves 162 can engage with the first guiding slots 124 to connect the connecting body 16 to the first plate 12. The second grooves 164 can engage with the second guiding slots 144 to connect the connecting body 16 to the second plate 14.

The guiding strip 18 enables smoother sliding of the connecting body 16 by decreasing the friction between the connecting body 16 and the upper and second plates 12, 14. The guiding strips 18 are thin and long strips secured inside the two sides of the first guiding slot 124 and the two sides of the second guiding slots 144.

To assemble the slide mechanism 10, the guiding strips 18 are respectively adhered to the first plate 12 and the second plate 14, and positioned at two sides of the first guiding slot 124 and the two sides of the second guiding slots 144. The connecting bodies 16 are assembled with the first plate 12 and the second plate 14. Due to the elasticity of the connecting bodies 16, the connecting bodies 16 can be pressed into the first guiding slots 124 and the second guiding slots 144. The first spacing walls 1622 are received in the first guiding slots 124 and the second guiding slots 144, and the first grooves 162 correspondingly receive the two sidewalls of the first guiding slots 124 therein, the second grooves 164 correspondingly receive the two sidewalls of the second guiding slots 144 therein. Therefore, the connecting bodies 16 connect the first plate 12 to the second plate 14, and the connecting bodies 16 can slide relative to the first guiding slots 124 and the second guiding slots 144.

Figure 3:
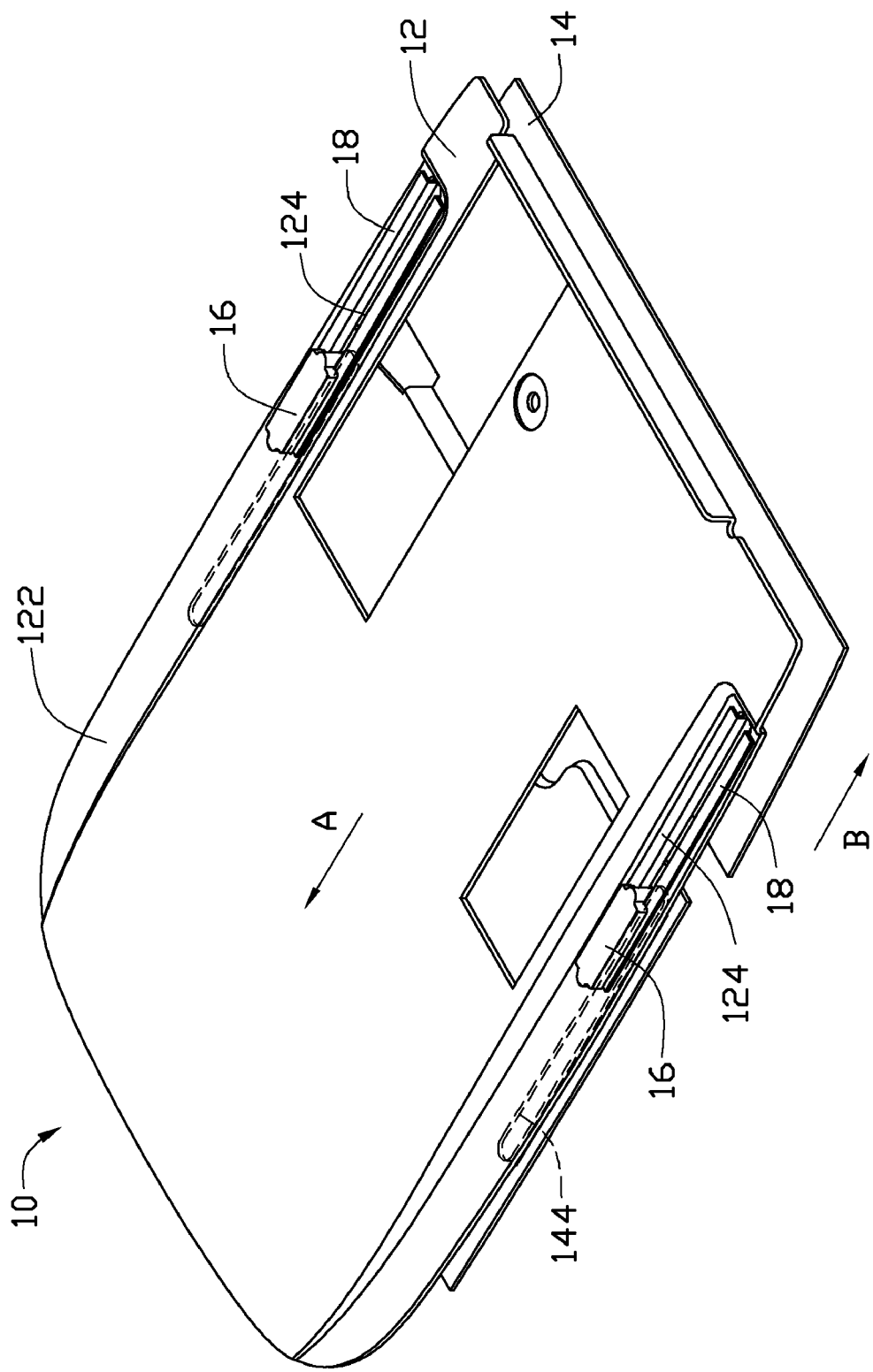
FIG. 3 is an assembled view of the slide mechanism shown in FIG. 1 in a closed state.
Figure 4:
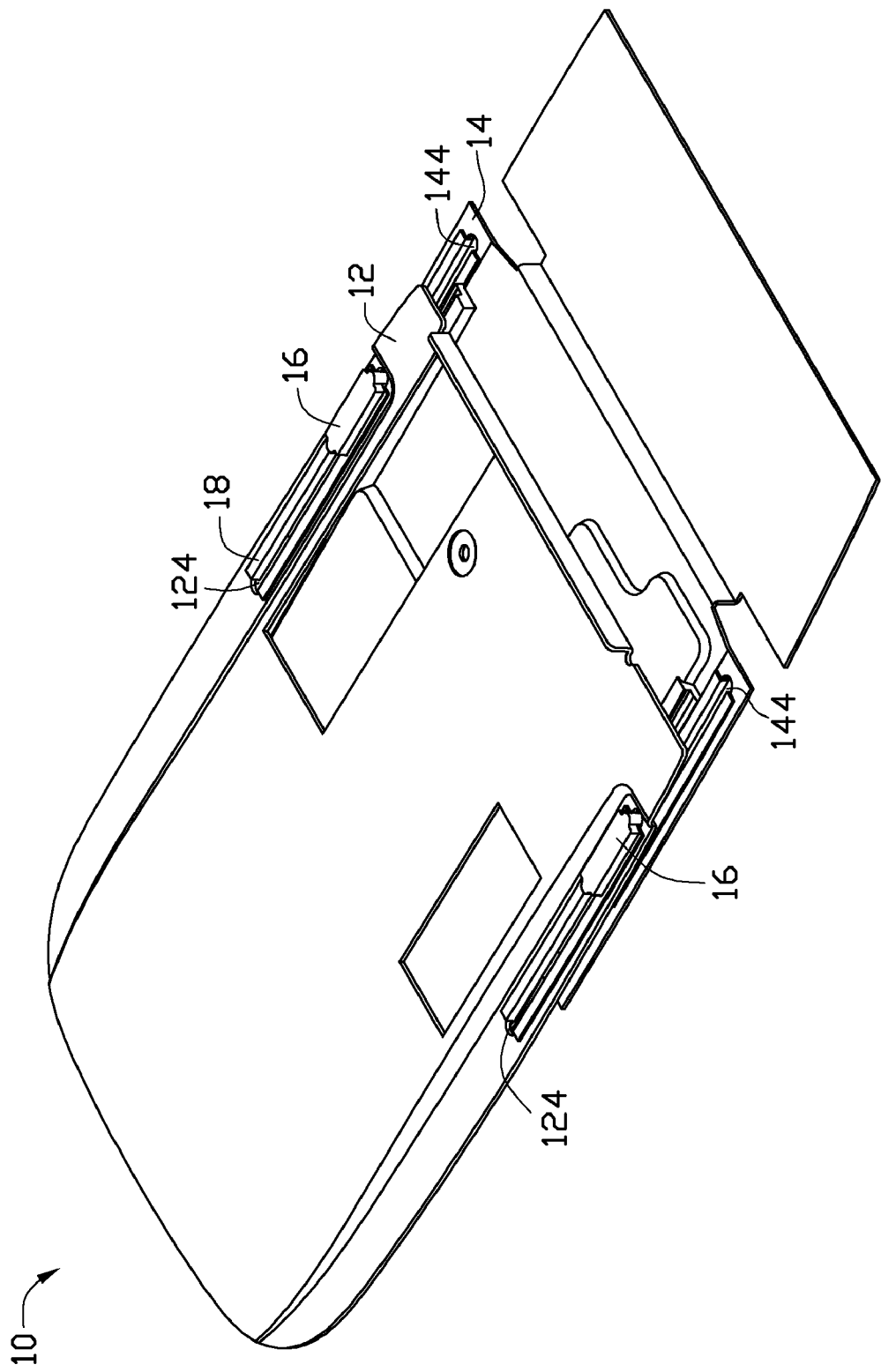
FIG. 4 is an assembled view of the slide mechanism shown in FIG. 1 in an opened state.

FIG. 3 shows the slide mechanism 10 in a closed position, where the first plate 12 completely covers the second plate 14. The connecting body 16 is located at an end of the first guiding slot 124, and simultaneously located at an end of the second guiding slot 144 overlapping the end of the first guiding slot 124. When subjected to an external force, the first plate 12 slides along direction A, the second plate 14 slides along direction B. When the first plate 12 is completely opened relative to the second plate 14 (as shown in FIG. 4), the connecting body 16 is positioned at the other end of the first guiding slot 124, and simultaneously positioned at the other end of the second guiding slot 144 overlapping the other end of the first guiding slot 124.

Figure 5:
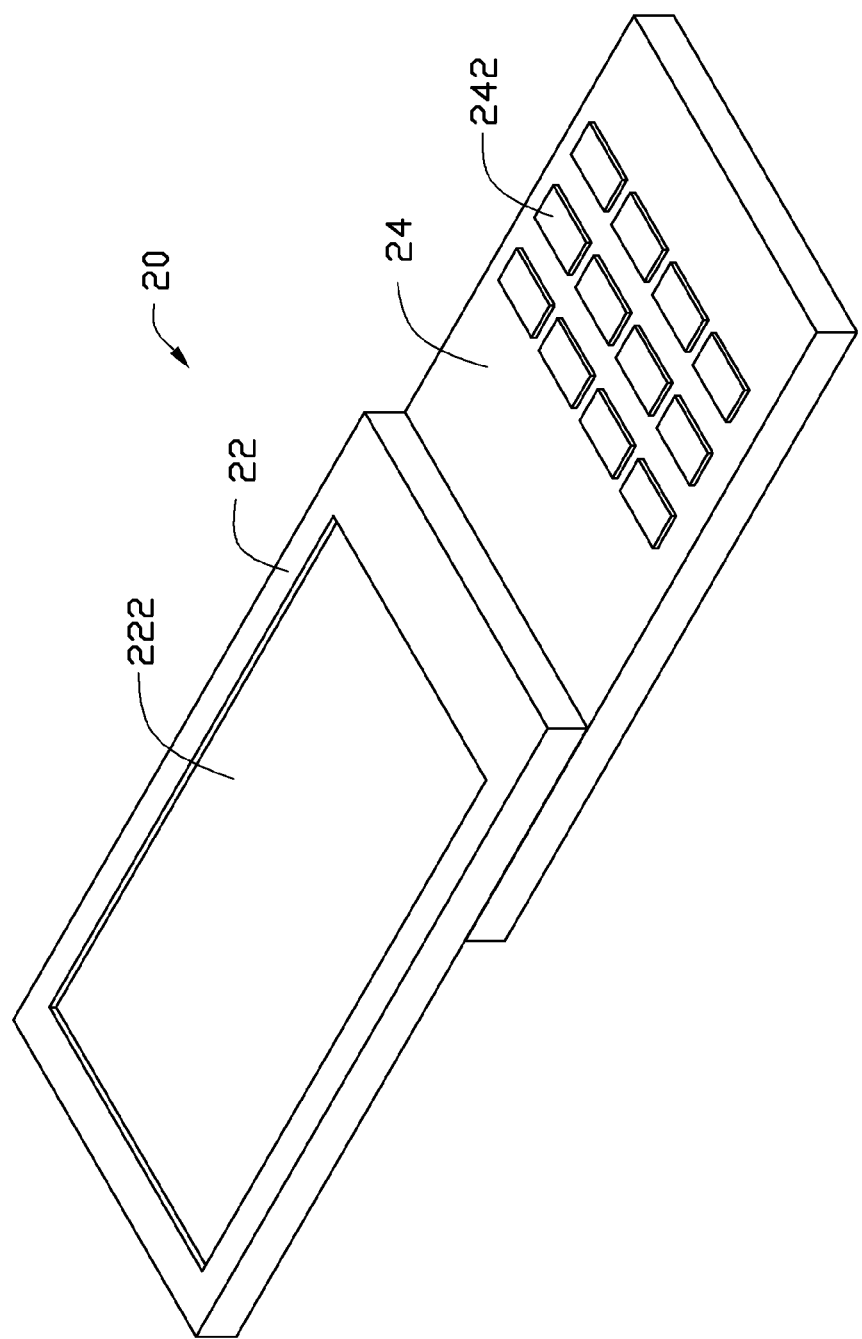
FIG. 5 is a view of a portable electronic device applying the slide mechanism shown in FIG. 1.

Referring to FIG. 5, the slide mechanism 10 is applied to a portable electronic device 20. The electronic device 20 includes a cover 22 and a housing 24. The cover 22 has a display 22 formed thereon, the housing 24 has a keypad 242 formed thereon. The cover 22 secures to the first plate 12, and the housing 24 secures to the second plate 14, accordingly, the cover 22 can open or close relative to the housing 24 accompanying the opening or closing of the slide mechanism 10.

As described above, the first plate 12 connects the second plate 14 by passing of the connecting body 16 through the first guiding slot 124 and the second guiding slot 144. Thus, the configuration of stopper and post as described in the Background can be avoided. The sliding distance of the first plate 12 relative to the second plate 14 is about equal to the sum of the length of the first and second guiding slots 124, 144, and accordingly can provide more sliding distance than the typical sliding mechanism.

In other embodiments, the connecting body 16 can be made of metallic materials. In order to assemble with the guiding slots 124, 144, referring to FIG. 2 again, the connecting body 16 can be separated into a top potion 161, a middle portion 163, and a bottom portion 165. During assembly, the middle portion 163 can be welded to the top portion 161 and the bottom portion 165.

In other embodiments, an elastic member, such as a torsion spring, can be arranged between the first plate 12 and the second plate 14 to provide a pulling force when the first plate 12 slides a predetermined distance relative to the second plate 14.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A slide mechanism for a portable electronic device, comprising: a first plate defining a first guiding slot at each of its sides; a second plate defining a second guiding slot at each of its sides; and two connecting bodies, each connecting body passing through the first guiding slot and the corresponding second guiding slot to connect the first plate and the second plate, and the connecting body slidable relative to the first guiding slot and the second guiding slot; wherein each connecting body includes two opposite sidewalls, each side wall defining a first groove and a second groove, the first groove is parallel with the second groove, the first groove engages with the first guiding slot to connect the connecting body to the first plate, the second groove engages with the second guiding slot to connect the connecting body to the second plate; and wherein the connecting body forms a first spacing wall between the two opposite first grooves and between the two opposite second grooves, the first spacing wall has substantially the same width as the first guiding slot.

2. The slide mechanism as claimed in claim 1, wherein the first guiding slot has substantially the same width as the second guiding slot.

3. The slide mechanism as claimed in claim 2, wherein the connecting body is made of metal and includes a top portion, a middle portion and a bottom portion, the top portion cooperates with the middle portion to form the first groove, the bottom portion cooperates with the middle portion to form the second groove.

4. The slide mechanism as claimed in claim 1, wherein the connecting body is made of elastic material.

5. The slide mechanism as claimed in claim 1, wherein the slide mechanism includes a plurality of guiding strips, the guiding strips are secured inside the first and the second guiding slots.

6. A portable electronic device, comprising: a housing; a cover; and a slide mechanism connected to the housing and the cover to allow the cover to slide relative to the housing, wherein the slide mechanism includes a first plate defining two first guiding slots, a second plate defining two second guiding slots, and two connecting bodies; each connecting body passes through the first guiding slot and the corresponding second guiding slot to connect the first plate and the second plate, and the connecting body is slidable relative to the first guiding slot and the second guiding slot; wherein each connecting body includes two opposite sidewalls, each side wall defining a first groove and a second groove, the first groove is parallel with the second groove, the first groove engages with the first guiding slot, the second groove engages with the second guiding slot; and wherein the connecting body forms a first spacing wall between the two opposite first grooves and between the two opposite second grooves, the first spacing wall has substantially the same width as the first guiding slot.

7. The portable electronic device as claimed in claim 6, wherein the first guiding slot has substantially the same width as the second guiding slot.

8. The portable electronic device as claimed in claim 6, wherein the connecting body is made of elastic material.

9. The portable electronic device as claimed in claim 6, wherein the connecting body is made of metal and includes a top portion, a middle portion and a bottom portion, the top portion cooperates with the middle portion to form the first groove, the bottom portion cooperates with the middle portion to form the second groove.

10. The portable electronic device as claimed in claim 6, wherein the slide mechanism includes a plurality of guiding strips, the guiding strips are secured inside the first and the second guiding slots.

* * * * *